United States Patent [19]

Frazer

[11] 4,226,970

[45] Oct. 7, 1980

[54] POLYESTERS DERIVED FROM DIKETODIOLS AND AROMATIC DICARBOXYLIC ACIDS AND FILAMENTS THEREOF

[75] Inventor: August H. Frazer, Wilmington, Del.

[73] Assignee: E. I. Du Pont de Nemours and Company, Wilmington, Del.

[21] Appl. No.: 59,891

[22] Filed: Jul. 23, 1979

[51] Int. Cl.$^2$ ............................................. C08G 63/18
[52] U.S. Cl. .................................. 528/128; 528/125; 528/220
[58] Field of Search ...................... 528/125, 128, 220

[56] References Cited

U.S. PATENT DOCUMENTS

| | | | |
|---|---|---|---|
| 3,518,175 | 6/1970 | Ball | 528/128 |
| 3,729,447 | 4/1973 | Haberland et al. | 528/128 |
| 3,809,682 | 5/1974 | Studinka et al. | 528/128 |
| 3,928,295 | 12/1975 | Rose | 528/125 |
| 3,979,459 | 9/1976 | Rose | 260/591 |
| 4,137,218 | 1/1979 | Prevorsek | 528/125 |

Primary Examiner—Lester L. Lee

[57] ABSTRACT

High modulus filaments are melt-spun from polyesters which are derived from certain substituted aromatic diketodiols and aromatic dicarboxylic acids. The polyesters are optically anisotropic in the melt. As-spun filaments from these polyesters can be heat treated while free from tension to increase their tenacity.

7 Claims, No Drawings

POLYESTERS DERIVED FROM DIKETODIOLS AND AROMATIC DICARBOXYLIC ACIDS AND FILAMENTS THEREOF

BACKGROUND OF THE INVENTION

1. Field of the Invention

This invention pertains to fiber-forming melt-spinnable aromatic polyesters and to high modulus filaments thereof.

2. Description of the Prior Art

A class of aromatic polyesters that form optically anisotropic melts from which oriented filaments can be melt-spun has been described in U.S. Pat. No. 4,118,372 to Schaefgen. The polyesters which are described in the aforementioned reference are derived primarily from para-oriented dihydric phenols and para-oriented aromatic dicarboxylic acids. Filaments that are melt-spun from such polyesters can be heat treated to high tenacity and modulus.

This invention provides different anisotropic-melt-forming polyesters which can be melt-spun into filaments of high as-spun modulus [e.g., greater than 200 g/denier (177 dN/tex)]. The novel filaments can also be heat treated to increase their tenacities, preferably to a level in excess of 10 g/denier (8.84 dN/tex), while retaining moduli in excess of 200 g/denier (177 dN/tex).

SUMMARY OF THE INVENTION

The present invention is directed to fiber-forming (co)polyesters that exhibit optical anisotropy in the melt and consist essentially of units having the structural formulas

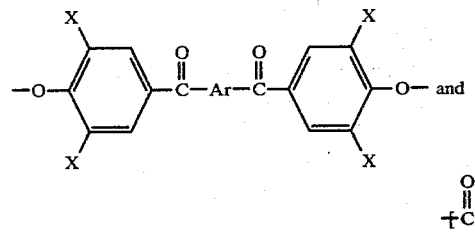

in substantially equimolar amounts and wherein X is methyl- or chloro- and Ar is m- or p-phenylene with the proviso that when Ar is p-phenylene $R_2$ is selected from the group consisting of (a) p-phenylene (15–40 mol %) and m-phenylene (60–85 mol %);
(b) p-phenylene (0–35 mol %) and ethylenedioxybis-p-phenylene (65–100 mol %);
(c) m-phenylene (0–50 mol %) and ethylenedioxybis-p-phenylene (50–100 mol %); and
(d) m-phenylene (0–30 mol %) and p,p'-biphenylene (70–100 mol %) and when Ar is m-phenylene, $R_2$ is selected from the group consisting of
(e) p-phenylene (0–35 mol %) and p,p'-biphenylene (65–100 mol %);
(f) p-phenylene (0–60 mol %) and ethylenedioxybis-p-phenylene (40–60 mol %);
(g) m-phenylene (0–40 mol %) and ethylenedioxybis-p-phenylene (60–100 mol %), and
(h) m-phenylene (15–50 mol %) and p,p'-biphenylene (50–85 mol %).

It also relates to high modulus filaments of such polyesters.

DETAILED DESCRIPTION OF THE INVENTION

The (co)polyesters of the present invention consist essentially of

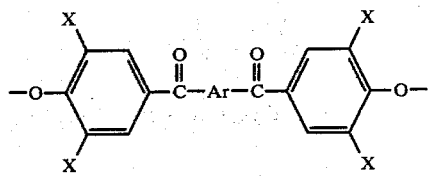

units derived from diketodiols and

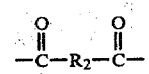

units derived from aromatic dicarboxylic acids in substantially equimolar amounts. In the diketodiols X is chloro- or methyl- and Ar is p- or m-phenylene. The diketodiols are prepared as described in the copending, coassigned patent application to Anderson & Clement Ser. No. 059,890 filed on even date herewith. When Ar is p-phenylene, the

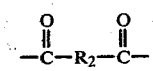

units are selected from the group consisting of

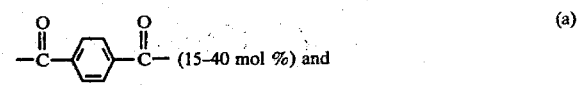

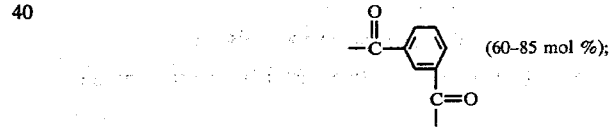

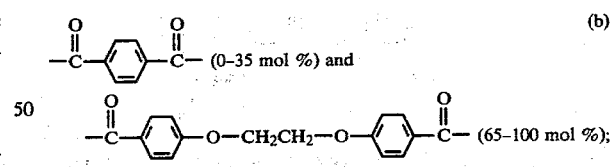

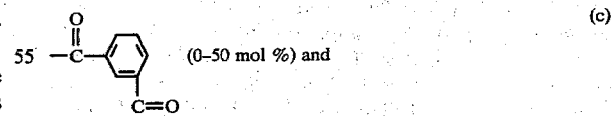

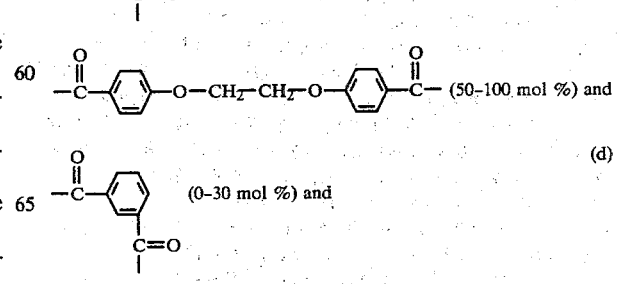

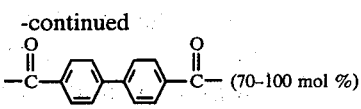 (70-100 mol %)

When Ar is m-phenylene, the

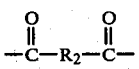

units are selected from the group consisting of

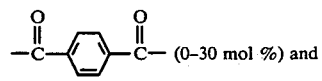 (0-30 mol %) and

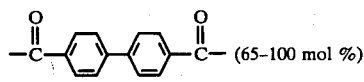 (65-100 mol %)

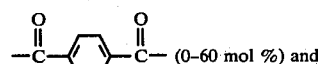 (0-60 mol %) and (f)

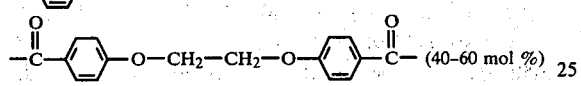 (40-60 mol %)

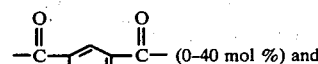 (0-40 mol %) and (g)

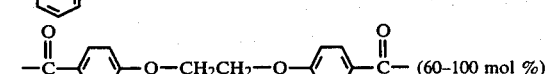 (60-100 mol %)

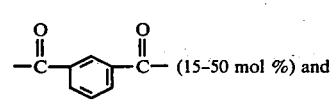 (15-50 mol %) and (h)

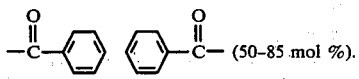 (50-85 mol %).

Preparation of Diketodiols

The diketodiols and diketodiesters of the formula

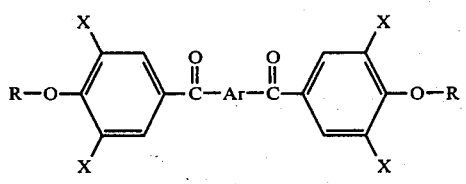

where X is methyl or chlorine, Ar is m- or p-phenylene and R is hydrogen or hydrocarbyl of from 1-10 carbon atoms are prepared by reacting, under anhydrous conditions, a disubstituted monophenol, such as 2,6-dimethyl- or 2,6-dichlorophenol with terephthalic (for Ar=p-phenylene) or isophthalic (for Ar=m-phenylene) acid (or its diester) or hydrogen fluoride in the presence of boron trifluoride. The reaction is allowed to proceed to about 0° to about 100° C. For example, terephthalic acid (83 g) and 2,6-dimethylphenol (122 g) are charged to a 1 liter Hastalloy C ® shaker tube. The tube was cooled and then charged with hydrogen fluoride (400 g) and boron trifluoride (150 g). It was warmed to 50° C., shaken at 50° C. for 4 hr, then cooled and vented. The contents, a dark red solid in a dark red solution, were allowed to evaporate in the hood to afford crude 1,4-bis(3,5-dimethyl-4-hydroxybenzoyl)benzene as a dark red solid. This material was stirred with 2 l. of water, warmed and isolated by filtration of the warm mixture. It was again stirred with 2 l. of water, warmed, neutralized with sodium bicarbonate, and isolated by filtration of the warm mixture. After being washed with water and air dried, the product was obtained as a tan powder in a yield of 79%.

The diol (148 g, 0.40 mole) was placed in a two-liter round-bottom flask which was equipped with a mechanical stirrer, a thermometer, and a water condenser through which the apparatus was attached to a source of nitrogen gas and vented to the atmosphere through a bubble tube. The reaction was run under an atmosphere of nitrogen. Acetic anhydride (163 g, 1.60 mole), acetic acid (550 ml) and trifluoromethanesulfonic (6.3 g) were added, and the mixture was stirred at ambient temperature for 94 hr. It was then stirred into 2 l. of water, filtered, and the precipitate was washed with water and air dried to afford a crude product in a yield of 174.7 g, as a light tan powder.

The product was stirred with 3500 ml of acetic acid, heated to boiling, cooled, and filtered. The precipitate was crystallized from acetic acid at a charge of 40 g/1250 ml, and afforded 1,4-bis(4-acetoxy-3,5-dimethylbenzoyl)benzene, analytically pure, as glistening yellow crystals, in a yield of 149.9 g (82%). It had m.p. 255°–256° C. The chloroderivative is obtained by substitution of 2,6-dichlorophenol for the 2,6-dimethylphenol reactant.

The polyesters of the invention are capable of forming optically anisotropic melts and have a molecular weight sufficient for melt-spinning into filaments. The term "polyesters" is intended to include both homopolyesters and copolyesters.

POLYMERIZATION CONDITIONS

The polyesters may be prepared by standard melt polymerization techniques from one or more aromatic dicarboxylic acids of the formula

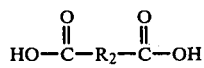

where $R_2$ is defined as above, and a diketodiol as defined as above. Frequently the diketodiols are employed in their diester form (e.g., diacetate). The diphenol and diacids are normally combined in substantially equimolar amounts and heated in a reaction vessel under nitrogen with stirring for about 1 to 3 hours. Temperatures employed for the polymerization are above the melting points of the reactants and are generally in the range of 200° to 350° C. The reaction vessel is equipped with means to permit by-product removal while polymerization takes place. A vacuum is normally applied towards the end of the polymerization to facilitate removal of remaining by-products and to complete the polymerization. Polymerization conditions such as temperature, duration of heating, pressures, etc., may be varied according to, e.g., the reactants employed and the degree of polymerization desired.

Filament Preparation

The (co)polyesters may be spun into filaments by conventional melt-spinning techniques. A melt of the polymer is extruded through a spinneret into a quenching atmosphere (e.g., air or nitrogen maintained at room temperature) and wound up. General spinning conditions are given in U.S. Pat. No. 4,066,620.

As used herein, the term "as-spun" fiber refers to a fiber which has not been drawn or heat treated after extrusion and normal windup.

Heat Treatment and Utility

The as-spun fibers of this invention may be subjected to heat treatment in an oven while relaxed to provide high strength fibers useful for a variety of industrial applications such as plastic and rubber reinforcement. In the heat treating process, fiber samples, as skeins or on bobbins (preferably collapsible bobbins) are usually heated in an inert atmosphere that is continuously purged by flow of inert gas through the oven to remove by-products from the vicinity of the fiber. Temperatures approaching the fusion point but sufficiently below to prevent interfilament fusion are employed. Preferably the maximum temperature is reached in a stepwise fashion.

Measurements and Tests

Inherent viscosity ($\eta_{inh}$) is defined by the following equation:

$$\eta_{inh} = \frac{\ln(\eta_{rel})}{C}$$

wherein ($\eta_{rel}$ represents the relative viscosity and C represents a concentration of 0.5 gram of the polymer in 100 ml of solvent. The relative viscosity ($\eta_{rel}$) is determined by dividing the flow time in a capillary viscometer of the dilute solution by the flow time for the pure solvent. Flow times are determined at 30° C., and the solvent is a 40/60 mixture of 1,1,2,2-tetrachloroethane and phenol.

Fiber tensile properties are reported in customary units first with SI units in parentheses.

| Denier | in | g/9000 m (dtex) |
|---|---|---|
| Tenacity | in | g/denier (dN/tex) |
| Elongation | in | percent of un-stretched length |
| Modulus | in | g/denier (dN/tex) |

They are measured using the procedures shown in Morgan U.S. Pat. No. 3,827,998 on fibers that have been conditioned for at least one hour. At least three breaks are averaged.

Thermooptical Test (TOT) is described in U.S. Pat. No. 4,066,620. Polymers that pass this test (t) are considered to be optically anisotropic.

ORIENTATION ANGLE

Orientation angle is determined by the method of Kwolek U.S. Pat. No. 3,671,542, column 2, lines 8-41.

The following examples are illustrative of the present invention.

EXAMPLE 1

Copolyesters of 1,4-bis(3,5-dimethyl-4-hydroxybenzoyl)benzene and mixtures of isophthalic acid and terephthalic acid Seven copolyesters were prepared using the following procedures. To a glass reactor with a nitrogen inlet and sidearm were added 2.29 g (0.005 mole) of 1,4-bis(4-acetoxy-3,5-dimethylbenzoyl)-benzene and a mixture of isophthalic and terephthalic acids in the proportions shown in the following table. The mixture was heated under a nitrogen atmosphere for 18 hrs at 275° C. and for a further 6 hrs at 283° C., followed by 3 hrs at 283° C. under vacuum (>0.05 mm Hg pressure). The resulting polymer had a polymer melt temperature (PMT) and an inherent viscosity given below and could be manually spun into fibers from the melt.

| Prep. | Isophthalic Acid(I) (g) | (moles) | Terephthalic Acid(I) (g) | (moles) | I/T (molar) |
|---|---|---|---|---|---|
| a | 0.498 | 0.003 | 0.332 | 0.002 | 60/40 |
| b | 0.540 | 0.00325 | 0.290 | 0.00175 | 65/35 |
| c | 0.581 | 0.0035 | 0.299 | 0.0015 | 70/30 |
| d | 0.622 | 0.00375 | 0.208 | 0.00125 | 75/25 |
| e | 0.644 | 0.0040 | 0.166 | 0.001 | 80/20 |
| f | 0.706 | 0.00425 | 0.124 | 0.00075 | 85/15 |
| g | 0.747 | 0.0045 | 0.083 | 0.0005 | 90/10 |

The copolyester product had the following properties:

| Prep. | PMT(°C.) | Inherent Viscosity | TOT |
|---|---|---|---|
| a | 380 | 0.52 | + |
| b | 370 | 0.53 | + |
| c | 360 | 0.57 | + |
| d | 350 | 0.60 | + |
| e | 335 | 0.63 | + |
| f | 320 | 0.65 | + |
| g | 305 | 0.68 | − |

The copolyesters, preparations b-f were mechanically melt-spun at spinneret temperatures of 345° to 370° C., and the fibers were wound up at speeds of 500-1100 yards/min. Tensile properties of the fibers (10 inch breaks) were measured at room temperature, as-spun (1) and after heat treatment on a bobbin in a nitrogen atmosphere at 260° to 275° C. for periods of up to 24 hours (2). The average (3 breaks) tensile properties of heat-treated fibers were also measured at 150° C. (3). Data obtained are summarized in Table 1.

The results of heat-treating single filaments of preparations b-f, melt-spun as above and heat-treated on a bobbin at 285° C. under nitrogen are shown in Table 2; tensile data (3-break average) were obtained at room temperature.

TABLE 1

| Prep. | Spinneret Temperature (°C.) | Denier |
|---|---|---|
| b | 370 | 4 |
| c | 365 | 4 |
| d | 355 | 4 |
| e | 355 | 160 |
| f | 345 | 160 |

| Prep. | Fiber Treatment | Tenacity (g/d) | Elong. % | Modulus (g/d) | Orientation Angle |
|---|---|---|---|---|---|
| b | 1 | 3.4 | 0.9 | 510 | 20 |
|   | 2 | 15.1 | 2.1 | 550 | 19 |
| c | 1 | 3.5 | 1.0 | 510 | 20 |
|   | 2 | 15.1 | 2.0 | 542 | 19 |
| d | 1 | 4.0 | 1.0 | 500 | 20 |
|   | 2 | 15.2 | 2.3 | 530 | 19 |
| e | 1 | 5.3 | 2.1 | 500 | 16 |
|   | 2 | 17.3 | 3.3 | 552 | 15 |
|   | 3 | 10.9 | 3.5 | 370 |   |
| f | 1 | 5.1 | 1.8 | 485 | 16 |
|   | 2 | 15.8 | 3.5 | 502 | 15 |

TABLE 1-continued

| | | | |
|---|---|---|---|
| 3 | 9.95 | 3.2 | 334 |

TABLE 2

| | Single Filament Properties | | | |
|---|---|---|---|---|
| Prep. | Break Length (in) | Tenacity (g/d) | Elongation (%) | Modulus (g/d) |
| b | 1 | 17.1 | 2.3 | 570 |
| c | 1 | 17.2 | 2.1 | 550 |
| d | 10 | 16.2 | 2.2 | 532 |
|   | 1 | 16.8 | 2.3 | 530 |
| e | 10 | 20.9 | 3.3 | 550 |
|   | 1 | 22.8 | 3.3 | 550 |
| f | 10 | 18.3 | 3.5 | 502 |
|   | 1 | 19.5 | 3.3 | 502 |

In place of the mixture of isophthalic and terephthalic acids in this example, there may be employed 4,4'-bibenzoic acid or a mixture thereof with isophthalic acid in the proportion of 0–30 mol % isophthalic and 70–100 mol % 4,4'-bibenzoic acid. Similar results can be expected when 1,4-bis(3,5-dichloro-4-hydroxybenzoyl)-benzene is employed as the diketodiol reactant of this example.

EXAMPLE 2

Copolyesters of 1,3-bis(3,5-dimethyl-4-hydroxybenzoyl)-benzene and mixtures of 4,4'-bibenzoic acid and terephthalic Acid Four copolyesters were prepared by the procedure of Example 1. In each preparation, 2.29 g (0.005 mole) of 1,3-bis(4-acetoxy-3,5-dimethylbenzoyl)-benzene was mixed with 4,4'-bibenzoic and terephthalic acids, as follows:

| Prep. | 4,4'-bibenzoic acid (BB) (g) | (moles) | Terephthalic Acid (T) (g) | (moles) | BB/T (molar) |
|---|---|---|---|---|---|
| a | 1.150 | 0.00475 | 0.042 | 0.00025 | 95/5 |
| b | 1.025 | 0.00425 | 0.125 | 0.00075 | 85/15 |
| c | 0.908 | 0.00375 | 0.208 | 0.00125 | 75/25 |
| d | 0.799 | 0.00335 | 0.274 | 0.00165 | 66/33 |

The copolyester products had the following properties:

| Prep. | PMT(°C.) | Inherent Viscosity | TOT |
|---|---|---|---|
| a | 360 | 0.50 | + |
| b | 360 | 0.52 | + |
| c | 355 | 0.51 | + |
| d | 350 | 0.52 | − |

Fibers could be manually melt spun in each case.

The copolyester, preparation b, was mechanically melt-spun, following the procedure of Example 1. Tensile data obtained from as-spun fiber (spinneret temperature, 360° C.; denier 160) and from single filaments, heat-treated as in Example 1 are shown below.

| Fiber Treatment | Tenacity (g/d) | Elong. (%) | Modulus (g/d) | Orientation Angle |
|---|---|---|---|---|
| 1 | 5.0 | 1.9 | 500 | 17 |
| 2 | 16.9 | 3.1 | 549 | 15 |
| 3 | 10.7 | 3.4 | 369 | — |
| 4 | 23.8 | 3.3 | 549 | — |

Fiber Treatment Key
1 = As-spun, measured at room temperature, 10 in. breaks
2 = Heat-treated, measured at room temperature, 10 in. breaks
3 = Heat-treated, measured at 150° C., 10 in. breaks
4 = Heat-treated single filaments, measured at room temperature, 1 in. breaks Similar results can be expected when 1,3-bis(3,5-dichloro-4-hydroxybenzoyl)benzene is employed as the diketodiol reactant of this example. Also, in place of the mixture of terephthalic

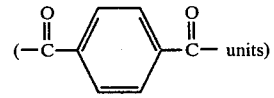

and 4,4'-bibenzoic acids

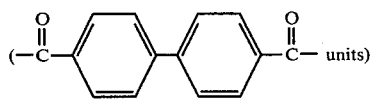

there may be used a mixture of isophthalic

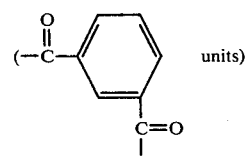

and 4,4'-bibenzoic acids in the proportions of 15–50 mol % isophthalic and 50–85 mol % 4,4'-bibenzoic acid or a mixture of terephthalic and ethylenedioxy 4,4'-bis(benzoic acid)

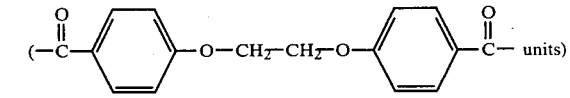

in the proportion of 0–60 mol % terephthalic and 40–60 mol % of the other acid.

I claim:

1. A fiber-forming (co)polyester consisting essentially of units having the structural formulas

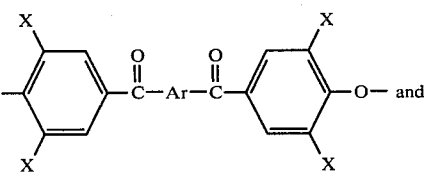 and

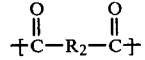

in substantially equimolar amounts and wherein X is methyl- or chloro- and Ar is m- or p-phenylene with the proviso that when Ar is p-phenylene $R_2$ is selected from the group consisting of
(a) p-phenylene (15–40 mol %) and m-phenylene (60–85 mol %);
(b) p-phenylene (0–35 mol %) and ethylenedioxybis-p-phenylene (65–100 mol %);
(c) m-phenylene (0–50 mol %) and ethylenedioxybis-p-phenylene (50–100 mol %); and
(d) m-phenylene (0–30 mol %) and p,p'-biphenylene (70–100 mol %) and when Ar is m-phenylene, $R_2$ is selected from the group consisting of
(e) p-phenylene (0–35 mol %) and p,p'-biphenylene (65–100 mol %);
(f) p-phenylene (0–60 mol %) and ethylenedioxybis-p-phenylene (40–60 mol %);
(g) m-phenylene (0–40 mol %) and ethylenedioxybis-p-phenylene (60–100 mol %), and
(h) m-phenylene (15–50 mol %) and p,p'-biphenylene (50–85 mol %).

2. The polyester of claim 1 wherein Ar is p-phenylene and $R_2$ is p-phenylene (15–40 mol %) and m-phenylene (60–85 mol %).

3. The polyester of claim 1 wherein Ar is p-phenylene and $R_2$ is m-phenylene (0–35 mol %) and ethylenedioxybis-p-phenylene (65–100 mol %).

4. The polyester of claim 1 wherein Ar is p-phenylene and $R_2$ is m-phenylene (0–50 mol %) and ethylenedioxy-p-biphenylene (50–100 mol %).

5. The polyester of claim 1 wherein Ar is m-phenylene and $R_2$ is p-phenylene (0–60 mol %) and p,p'-biphenylene (65–100 mol %).

6. A filament of the polyester of claim 1.

7. A heat-treated filament according to claim 6 and having a modulus of greater than 200 g/denier and tenacity in excess of 10 g/denier.

* * * * *